United States Patent [19]

Clark et al.

[11] Patent Number: 4,844,848

[45] Date of Patent: Jul. 4, 1989

[54] METHOD FOR PREPARING AL$_2$O$_3$ POWDER AND PRODUCTS

[75] Inventors: David E. Clark; Kenneth W. Wistrom, both of Gainesville, Fla.

[73] Assignee: University of Florida, Gainesville, Fla.

[21] Appl. No.: 704,880

[22] Filed: Feb. 25, 1985

[51] Int. Cl.$^4$ ............................................. B29C 27/60
[52] U.S. Cl. ........................................ 264/43; 264/60; 428/539.5; 427/436
[58] Field of Search ...................... 264/43, 60, 66, 118, 264/119; 427/261, 434.5, 435, 436; 428/469–472, 539.5

[56] References Cited

U.S. PATENT DOCUMENTS

| | | | |
|---|---|---|---|
| 4,118,450 | 10/1978 | Nakamura et al. | 264/43 |
| 4,301,037 | 11/1981 | Sanchez et al. | 264/142 X |
| 4,341,663 | 7/1982 | Derleth et al. | 264/142 X |
| 4,419,394 | 12/1983 | Crone, Jr. | 428/689 X |

*Primary Examiner*—Peter A. Nelson
*Attorney, Agent, or Firm*—Fleit, Jacobson, Cohn & Price

[57] ABSTRACT

A composite made by milling Al$_2$O$_3$ gel to a powder in the size range of from about 20 mesh to about 400 mesh, mixing said Al$_2$O$_3$ gel powder with a reinforcement material consisting of SiC, SiO$_2$, C, Al$_2$O$_3$, ZrO$_2$, Si$_2$N$_4$, , BN, B$_4$O, Y$_2$O$_3$, TiC, TiB$_2$, TiN and aluminosilicate, compressing and firing at an elevated temperature.

11 Claims, No Drawings

METHOD FOR PREPARING AL$_2$O$_3$ POWDER AND PRODUCTS

This invention was made with Government support under F49620-83-C-0072 awarded by the Air Force. The Government has certain rights in this invention.

CROSS REFERENCES TO RELATED APPLICATIONS

This application is cross referenced to the following applications:

| Serial No. | Filing Date | Inventors |
|---|---|---|
| 583,737 | February 27, 1984 | CLARK et al, and now abandoned |
| 583,738 | February 27, 1984 | CLARK et al, and now abandoned |
| 583,741 | February 27, 1984 | HENCH et al |
| 583,742 | February 27, 1984 | HENCH et al, and now abandoned |
| 583,743 | February 27, 1984 | CLARK et al, and now abandoned, |
| 583,744 | February 27, 1984 | HENCH et al, and now abandoned |
| 583,745 | February 27, 1984 | CLARK et al, and now abandoned, |
| 704,913 | February 25, 1985 | CLARK et al, and now abandoned, |
| 704,914 | February 25, 1985 | CLARK et al, and now abandoned, |
| 704,917 | February 25, 1985 | HENCH et al |
| 704,918 | February 25, 1985 | HENCH et al |
| 704,935 | February 25, 1985 | HENCH |
| 704,937 | February 25, 1985 | HENCH |
| 704,938 | February 25, 1985 | HENCH et al |
| 704,939 | February 25, 1985 | HENCH et al, now Pat. No. 4,804,731, |
| 704,940 | February 25, 1985 | HENCH et al |
| 704,968 | February 25, 1985 | HENCH et al |
| 704,969 | February 25, 1985 | HENCH et al |
| 704,970 | February 25, 1985 | CLARK et al |
| 706,288 | February 27, 1985 | CLARK et al |

BACKGROUND OF THE INVENTION

This invention relates to a novel method of producing and using a flexible Al$_2$O$_3$ gel powder as a matrix to form a composite, and to products resulting from the practice of the method.

DESCRIPTION OF THE PRIOR ART

The preparation and potential advantages of sol-gel derived Al$_2$O$_3$ ceramics and ceramic composites have been disclosed in copending U.S. patent applications Ser. Nos. 583,737; 583,738; 583,743; and 583,745, filed Feb. 27, 1983. It has also been noted by several research investigators that the large and often non-uniform stresses that develop during drying of a sol-gel derived ceramic or green body can cause cracking. Large cracks which cannot be repaired render the green body gel useless for many applications. However, it has been discovered that if a dried Al$_2$O$_3$ containing gel is around into fine particles (i.e. powders) that subsequently, these powders can be formed into a variety of shapes by pressing.

SUMMARY OF THE INVENTION

The present invention provides a method for preparing Al$_2$O$_3$ powders that have advantages in the fabrication of composites, repair of cracks and bonding of ceramic parts together. The main advantage of alumina gel powders of the present invention over commercially prepared powders is the ease with which the invention can be compacted during forming. This is due to the superior plasticity of the alumina gel powders of the present invention, compared to the harder and less deformable alumina powders normally used in pressing and other types of forming processes. During compaction, the alumina gel powders of the invention can easily deform and conform to the shape of the forming die.

A second potential advantage of alumina gel powders of the invention is the fabrication of composites. The novel gel powders are less likely to damage reinforcement fibers or whiskers during pressing. Damaged fibers would, of course, result in poorer strengths.

SPECIFIC DESCRIPTION OF THE INVENTION

Alumina sol was made by reacting aluminum sec-butoxide (1 mole) with excess hot (80° C.) distilled water (100 moles) and nitric (0.0233 moles) and HCl (0.070 moles) acids. The mixture was gently boiled in a round bottom flask under a condenser column for a few days until the solution cleared.

The alumina sol was placed in a beaker and boiled on a hot plate until the sol was concentrated to approximately one third its original volume. A large magnetic stirrer was used to mix the solution. The dried gel was cast into Teflon ® molds. Samples were dried at 38° C. for five days.

Any other method may be used to produce the alumina gel, such as those described in the aforementioned patent applications here incorporated by reference.

The dried gel (about 100 grams) was placed in an alumina ball mill filled one third with alumina ball media. Any non-contaminating ball media may be used. After milling two hours, the powder was collected, sieved (−48 mesh), then dried at 60° C. The gel can be milled to a size corresponding to from about 20 mesh to about 400 mesh (Tyler).

The powder was pressed into a number of test samples at 10,000 psi for three minutes without a binder. The samples subsequently were fired at 1350° C. to densify and coalesce and maintained their integrity. Next, Al$_2$O$_3$ gel was made as above described and milled to a powder (−48 mesh). Silicon carbide whiskers (Arco) were mixed with the gel powder, without a binder, pressed and fired at 1350° C. to densify. These composites were homogeneous and maintained their integrity. The new method of this invention provides a way for fabricating ceramic composites for use in heat engines; abrasives; cutting tools; rocket nozzles; jet engines; and structured components where a combination of strength, toughness and temperature resistance are important.

The SiC whiskers used above were ½ micron in diameter and 10–80 microns in length. Loadings of 5–90% by weight of the total weight of the final composite are possible. In addition to SiC whiskers which are the preferred reinforcement, other forms of SiC, such as fibers or powders, can be used. Also, any short fiber or powder that is refractory, such as silica, Al$_2$O$_3$, aluminosilicate, carbon, and ZrO, may be used as the reinforcement.

Having now fully described the invention, it will be apparent to one of ordinary skill in the art that many changes and modifications can be made without departing from the spirit and the scope of the invention as set forth herein.

What is claimed is:

1. A method of making a composite comprising milling Al$_2$O$_3$ gel to a powder in the size range of from about 20% mesh to about 400 mesh, mixing said Al$_2$O$_3$ gel powder with a reinforcement material, compressing and firing at an elevated temperature to form a composite.

2. A method of claim 1 wherein the reinforcement material is selected from the group consisting of whiskers, fibers and powders.

3. The method of claim 1 wherein the reinforcement is a refractory material.

4. The method of claim 3 wherein the refractory material is selected from the group consisting of SiC, SiO$_2$, C, Al$_2$O$_3$, ZrO$_2$, Si$_3$N$_4$, BN, B$_4$C, Y$_2$O$_3$, TiC, TiB$_2$, TiN and aluminosilicate.

5. The method of claim 1 wherein the elevated temperature is above 900° C.

6. An intermediate suitable for firing to produce a composite comprising a Al$_2$O$_3$ gel powder with a reinforcement material distributed therein compressed in a preselected shape.

7. An intermediate according to claim 6 wherein the reinforcement material is selected from the group consisting of whiskers, fibers and powders.

8. An intermediate according to claim 6 wherein the reinforcement material is refractory.

9. An intermediate according to claim 8 wherein the refractory material is selected from the group consisting of SiC, SiO$_2$, C, Al$_2$O$_3$, ZrO$_2$, Si$_3$N$_4$, BN, B$_4$C, Y$_2$O$_3$, and aluminosilicate.

10. A method of making a shaped refractory product comprising miling a refractory metal oxide gel to a powder of a size less than about 20 mesh, compressing said powder into the shape of a refractory product and firing at an elevated temperature to densify and coalesce said powder.

11. The method of claim 10 wherein the metal oxide is Al$_2$O$_3$.

* * * * *

UNITED STATES PATENT AND TRADEMARK OFFICE
CERTIFICATE OF CORRECTION

PATENT NO. : 4,844,848
DATED : July 4, 1989
INVENTOR(S) : David E. Clark et al.

It is certified that error appears in the above-identified patent and that said Letters Patent is hereby corrected as shown below:

Title page:

In the Abstract, line 4, "$Si_2N_4$" should be --$Si_3N_4$--;

line 5, delete "," (first occurrence);

line 5, "$B_4O$" should be --$B_4C$--.

Column 1, line 58, "around" should be --ground--.

Column 3, line 3, "20%" should be --20--.

Column 4, line 13, "miling" should be --milling--.

Signed and Sealed this

Twelfth Day of June, 1990

*Attest:*

HARRY F. MANBECK, JR.

*Attesting Officer*   *Commissioner of Patents and Trademarks*